Dec. 20, 1960 J. J. YOSTPILLE 2,965,887

MULTIPLE INPUT DIODE SCANNER

Filed Aug. 22, 1955 3 Sheets-Sheet 1

INVENTOR
J. J. YOSTPILLE
BY
ATTORNEY

MULTIPLE INPUT DIODE SCANNER

Filed Aug. 22, 1955 3 Sheets-Sheet 2

INVENTOR
J. J. YOSTPILLE
BY
ATTORNEY

INVENTOR
J. J. YOSTPILLE
BY [signature]
ATTORNEY

United States Patent Office 2,965,887

Patented Dec. 20, 1960

2,965,887

MULTIPLE INPUT DIODE SCANNER

John J. Yostpille, Livingston, N.J., assignor to Bell Telephone Laboratories, Incorporated, New York, N.Y., a corporation of New York Filed Aug. 22, 1955, Ser. No. 529,686

9 Claims. (Cl. 340—176)

This invention relates to a scanner which utilizes asymmetrical current devices and resistors to provide paths rendered individually conductive by the concurrent open-circuiting of scanned terminals and the application of bias voltages to permutations of scanning control terminals.

In a variety of telephone switching apparatus, it is required to individually test the electrical condition of each of a plurality of conductors or terminals. Devices which have heretofore been used to perform such tests include relays, stepping type switches, and circuits comprehending the completion of paths through networks of resistors and asymmetrical current devices.

In complex telephone switching applications, scanning accomplished by relay circuits may, in some instances, be expensive in that many relays may be required. Similarly, scanning stepping switches may be expensive and may require considerable space for mounting.

Scanning networks of resistors and asymmetrical current devices have been devised to reduce the space and power requirements of scanners utilizing relays and stepping switches, illustrative of which is the scanner disclosed in Patent No. 2,563,589 granted to M. Den Hertog on August 7, 1951. Such networks, however, have required two or more sources of synchronized voltage, one being connected to the devices to be scanned, and another connected to certain scanning control terminals.

It is an object of this invention to reduce the number of synchronized scanning voltages required, and to provide for the scanning of terminals or devices without connection of a voltage source thereto.

Another object of this invention is to simplify network circuitry, thereby to substantially minimize the number of elements contained therein.

According to one feature of this invention, the mere grounding or ungrounding of a scanned terminal is recognized by the absence or presence, respectively, of voltage at a scanner output terminal in response to the energization of a permutation of control terminals and their associated control leads.

In accordance with another feature of this invention, resistors are advantageously included in the scanner network and are connected to certain of the control leads, thereby advantageously reducing the total number of components required.

Other objects and features of this invention will be apparent from the following detailed description, by way of example, with reference to the drawing in which.

Figure 1:
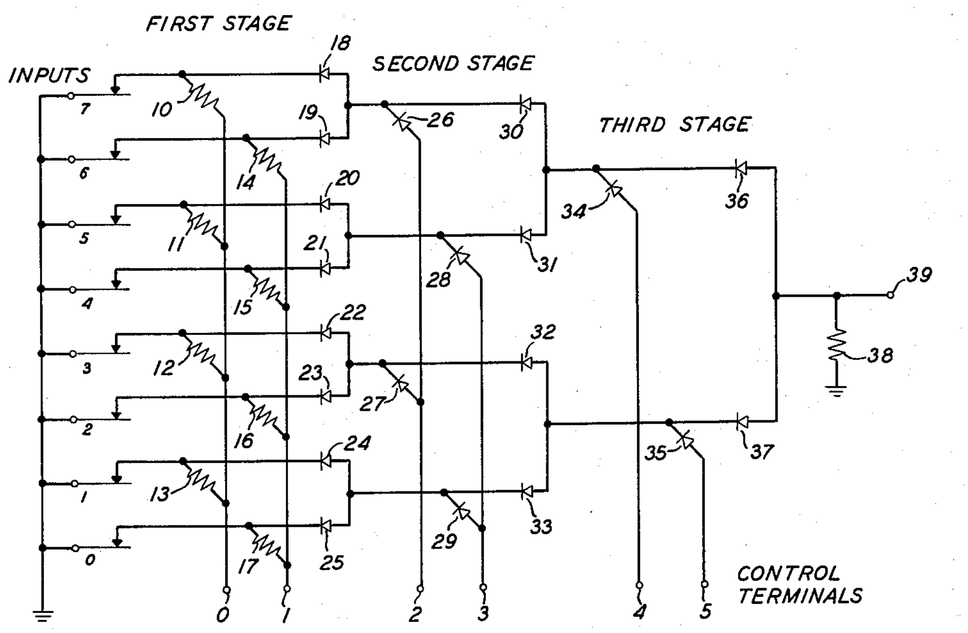
Fig. 1 is a schematic diagram of an elementary embodiment of the invention.

Referring now to Fig. 1, it will be noted that eight inputs numbered 0 through 7, six controls terminals numbered 0 through 5, and one output terminal 39 are connected to a three-stage progressive-binary-elimination type network comprising pluralities of resistors and asymmetrical current devices. The circuit therein illustrated is a simplified embodiment of the invention and is operable in accordance with the following description.

As is well known in the art, certain devices possess the property of asymmetry in electrical conduction, passage of current through such devices being only slightly impeded in one direction but effectively prevented in the opposite direction. Commercially available asymmetrical devices, such as the Western Electric Company 400B varistor for example, may have forward resistances of only 250 ohms and reverse resistances of 125,000 ohms or more.

In the drawing, asymmetrical current devices are represented by the conventional symbol of an arrowhead at right angles to a line. Positive current will flow only through the devices in the direction of the arrowheads.

Each of the eight inputs of Fig. 1 is positionable to either of two electrical conditions, ground (as shown) or open. The condition of each input, together with its identity, is presented to terminal 39 in the form of the presence or absence of an output thereat in response to the application of suitable negative biasing potentials to a permutation of the control terminals 0—5, each input point being specifically referable to one, and only one, such permutation. Thus if an input is grounded when the control terminals (control leads) of the permutation referable to the input are negatively biased, no voltage will appear at output terminal 39. On the other hand, if such input is not grounded when the control terminals of the permutation are negatively biased, then a voltage will appear at output terminal 39 regardless of the grounded or ungrounded condition of all the other inputs.

In the embodiment of Fig. 1, it is necessary to negatively bias one, and only one, of the two control terminals of each stage in order to scan an input, the remaining control terminals being effectively connected to ground. According to this requirement, eight different permutations of the control terminals 0—5 are possible. Sources of negative biasing potential (not shown) are not critical in regard to magnitude, and if said to be unity for the first stage, may for example approximate one-half that value for the second and third stages. These sources may take the form of a plurality of batteries or conventional cathode follower circuits, and may be arranged to be individually controlled by any suitable external device.

To illustrate operation of the embodiment of Fig. 1, first consider the condition in which all inputs are grounded, as shown. A voltage will appear at the output terminal 39 only in response to a current flowing through resistor 38. However, with all inputs grounded, no current will flow through resistor 38 in response to the biasing of any of the aforementioned permutations of control terminals 0—5 because the inputs and asymmetrical current devices respectively shunt and block paths leading from the sources of bias potential to the output terminal 39.

To demonstrate this circuit operation, any permutation of control terminals may be arbitrarily selected and energized in the manner hereinbefore indicated. For example, if control terminal 0 is among those selected, the entire magnitude of first stage bias potential will be developed across resistors 10 through 13, whereas if terminal 1 is thus included, the entire bias potential will be developed across resistors 14 through 17. The asymmetrical current devices 18 through 25 will be unaffected by first stage biasing since each will have its reverse conducting terminal connected to ground through the input grounding medium. If, therefore, any one of the asymmetrical devices is to conduct current, it will be necessary to drive the forward conducting side, that is, the side connected to the second stage, to a potential positive with respect to ground. This requirement cannot be met under the conditions stated because no such positive source of potential is connected to the network.

Since no current can flow through asymmetrical current devices 18 through 25, it would be necessary that any current which might flow in or out of the network through resistor 38 correspondingly flow within one or more of the biasing control conductors connected to control terminals 2, 3, 4 and 5. However, between these conductors and the network are connected asymmetrical current devices 26 through 29 and 34 and 35 which are arranged to prevent passage of current therethrough except under the condition in which the control terminals are more positive than the network terminals to which the asymmetrical devices are connected. Inasmuch as the entire magnitude of first stage bias potential is shunted across the aforementioned resistors 10—17, and inasmuch as no other source of potential more negative than the stage 2 and stage 3 negative bias voltages is connected to the network, no current will flow within the control terminal conductors connected to the control terminals 2, 3, 4 and 5, and therefore no current will flow in resistor 38 coincident with the grounding of all inputs.

It will now be demonstrated, by way of example, that a voltage will appear at terminal 39 coincident with opening of the path from any input to ground, coupled with a simultaneous application of negative biasing potentials to the proper permutation of control terminals.

If ground is disconnected from input No. 3, for example, and control terminals 0, 2 and 5 are energized with negative biasing potential (terminals 1, 3 and 4 being grounded), one, and only one, electrically conductive path will exist from ground through resistor 38 and thence through the network to control terminal 0. More specifically, the path will be extended through resistor 38, asymmetrical current devices 37, 32 and 22, resistor 12, and terminal 0 to negative biasing battery (not shown). The continuity of this path is contingent upon proper biasing of the devices indicated, this being accomplished in the manner next to be described.

If asymmetrical current devices 27 and 35 were disconnected from the network, it would be obvious that a conducting path would lie from ground through resistor 38, devices 37, 32 and 22, and thence through resistor 12 to the source of negative potential connected to terminal 0, all of the asymmetrical devices being poled to permit flow of current from the source of positive potential (ground) to the negative source connected to terminal 0. Voltage appearing at any point along this path of serially connected devices will, by Ohm's law, be a function of the magnitude of the terminal 0 bias potential and the parameters included in the path. In the instant embodiment, the magnitudes of resistors 12 and 38, as hereinafter described, are many times greater than the magnitudes of the forward resistance of devices 37, 32 and 22, and therefore the percentage of the bias voltage which will appear at points along the path connecting these resistors will be effectively determined by their ratio. The ratio of resistor 12 to resistor 38 is therefore chosen to cause the voltages of the sources of bias connected to terminals 2 and 5 to be more negative than the negative potentials appearing at the network points to which devices 27 and 35 are connected, thereby reverse-biasing these devices to a non-conducting state and effectively disconnecting them from the network. Thus, the path remains established from control terminal 0 via the network through resistor 38 to ground. Current flowing through this resistor causes an IR drop which appears as an output voltage at terminal 38.

No other path is established through the network upon the energization of terminals 0, 2 and 5. Any other path will be shunted to ground via one of the remaining grounded control terminals. For example, if input 7 were ungrounded, control terminal 0 negative bias would be developed across resistor 10, and although current would flow in response thereto, substantially no part of such current would pass through resistor 38 because of the direct path to ground via asymmetrical device 34 and control terminal 4.

It will be apparent therefore from the above explanation that an output voltage will appear at terminal 39 only if both of two conditions exist simultaneously, that is, if an input is ungrounded and if the control terminals of the referable permutation are energized from sources of suitable negative bias potential.

The type of bias potential source is not important to this invention. It may take the form of a plurality of batteries, each individually connected through some switching device to the control terminals; or it may take the form of a common source having a plurality of sw.tches connected therefrom to the aforementioned terminals. Still another source of bias potential may comprise a plurality of conventional cathode follower circuits, well known in the art, which might be especially advantageous in applications in which rapid switching of bias potentials is desired.

Representative circuit parameters and bias potentials applicable to Fig. 1 will now be given. Resistors 10 through 17 may approximate 20,000 ohms; asymmetrical current devices 18 through 37 may be similar to the Western Electric Company type 400B varistor; resistor 38 may approximate 13,000 ohms; and bias potentials may be approximately 20 volts for the first stage and 10 volts for the second and third stages.

Figure 2:
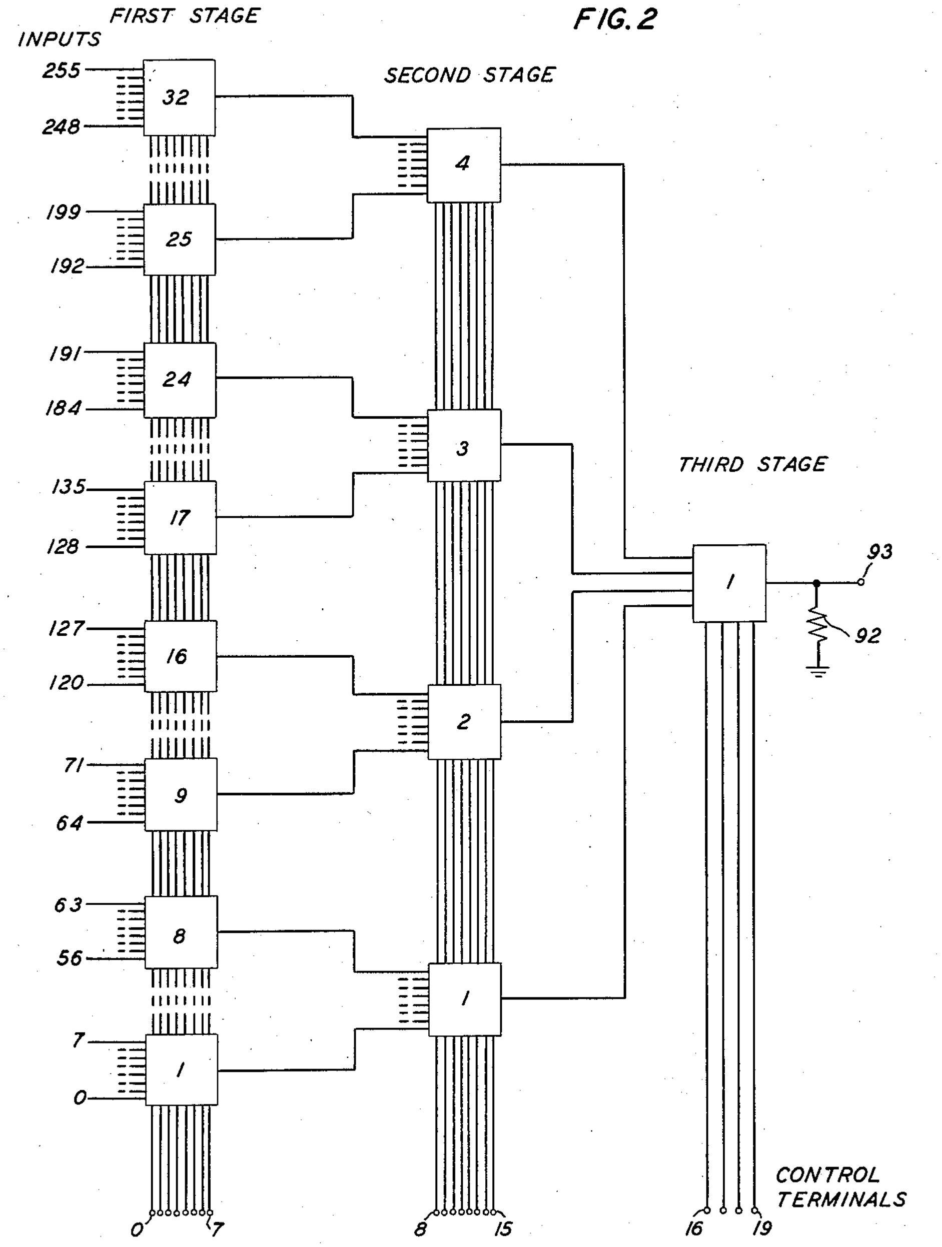
Fig. 2 is a schematic diagram of a 256 input point embodiment of the invention.

Now referring to Fig. 2, it will be noted that the scanner of Fig. 1 is therein expanded to a total of 256 inputs and 20 control terminals. Operation of this circuit is similar to that of the embodiment of Fig. 1; that is, a voltage will appear at terminal 93 in response to the energization of one control terminal in each of the three stages, concurrent with the ungrounding of the corresponding input.

Figure 3:
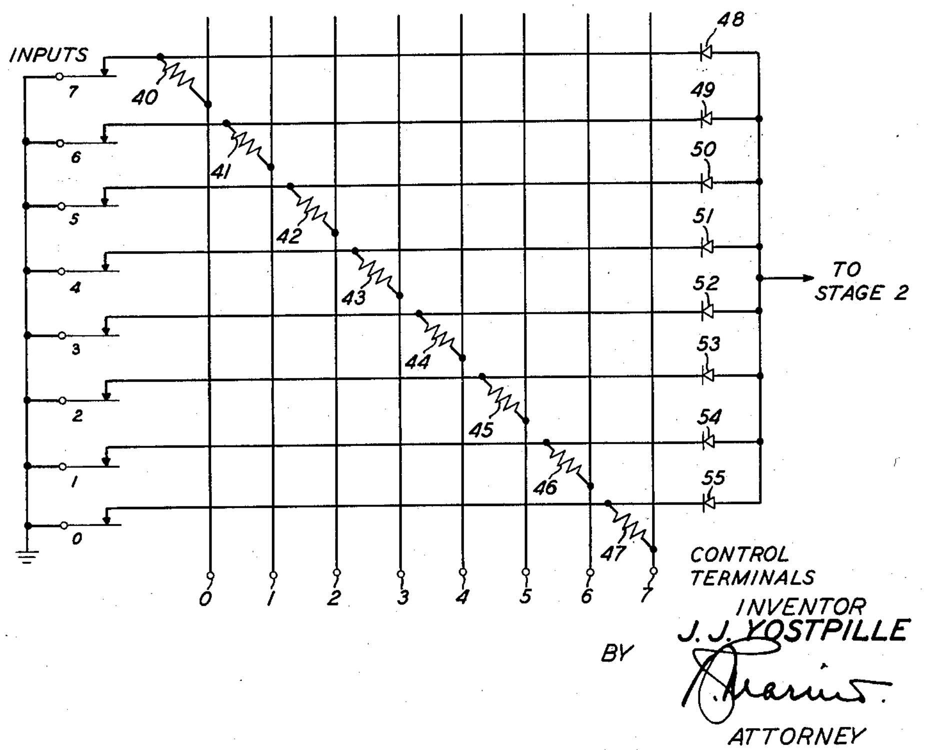
Fig. 3 is a schematic diagram illustrating the circuitry of each of the first stage scanning groups of Fig. 2.

Except for numerical identification of the inputs, and the fact that only one set of control terminals need be provided, each of the thirty-two first stage selecting circuits is identical to Fig. 3.

Fig. 3 reveals circuitry associated with eight inputs, each of which is initially selected by energizing the control terminal associated therewith. In Fig. 1, the first stage inputs are divided into four groups of two each, one or the other of the inputs in each group being selected by energizing one or the other of the two first stage control terminals. In Fig 3, however, a group of eight inputs is shown, the selection of which is analogously accomplished through energization of one of the eight control terminals.

Figure 4:
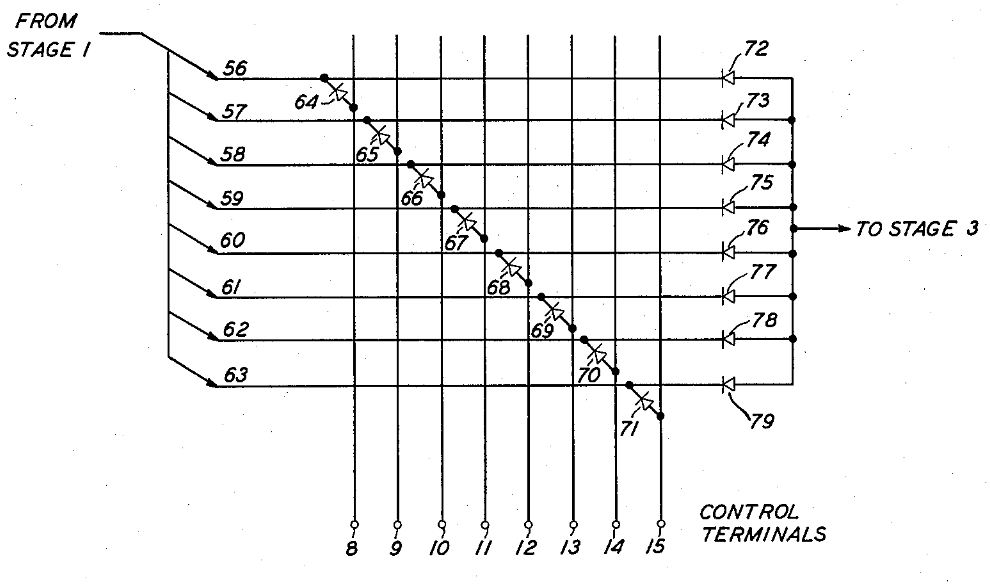
Fig. 4 is a schematic diagram of the circuitry of each of the second stage groups of Fig. 2.

Again, except for the control terminals of which only one set is required, Fig. 4 depicts the circuitry of each of the four second stage selecting groups. Selection here is made of one of the eight incoming conductors by energizing the appropriate control terminal; whereas in the embodiment of Fig. 1, selection is made on a one-out-of-two basis within each of the two second stage groups.

Figure 5:
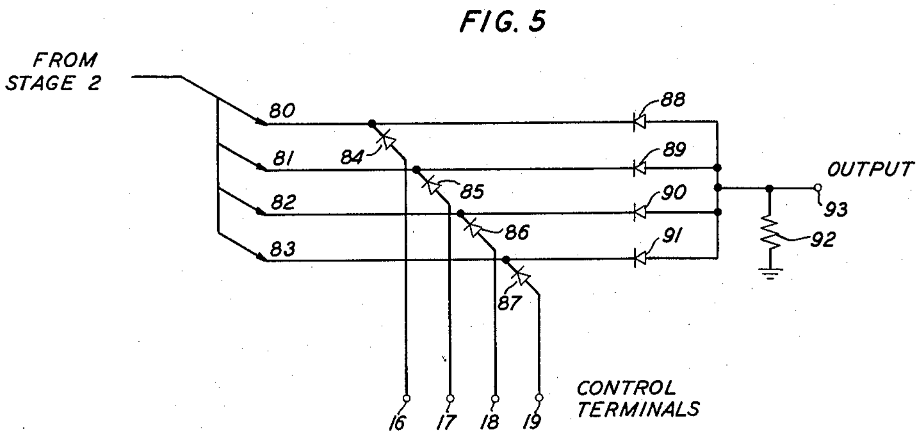
Fig. 5 is a schematic diagram of the circuitry of the third stage of Fig. 2.

In Fig. 5, circuitry of the third stage of Fig. 2 is set forth, and selection is correspondingly accomplished on a one-out-of-four basis through energization of the appropriate control terminal; whereas in Fig. 1, selection is made on a one-out-of-two basis as hereinbefore described.

Corresponding circuit parameters of the expanded version depicted in Fig. 2 may be identical to those hereinbefore set forth in connection with Fig. 1. Similarly, sources of bias potential may take the form of any of those heretofore mentioned; however, it may be of interest to note that in commercial embodiments, the use of electronically controlled sources of bias may be especially advantageous in that rapid scanning of the entire plurality of inputs may thereby be accomplished.

Devices contemplated for grounding and ungrounding the inputs may comprise any suitable apparatus such as the contacts of relays, electronic switches, or other circuit opening or closing devices.

Although the subject invention has been illustrated by a particular embodiment thereof, the invention is not limited to the specific circuits therein disclosed. Various applications, modifications and arrangements of the invention will readily occur to those skilled in the art. For example, additional pluralities of input points could be included through a logical expansion of the circuit in accordance with the principles hereinbefore disclosed. Similarly, input, output and intermediate stages could be arranged to select one from any plurality of conductors in the manner described, and circuit parameters could be substantially varied from those suggested above.

The terms and expressions hereinbefore employed in reference to the invention are used as terms of description and not of limitation; and there is no intention in the use of such terms and expressions of excluding equivalents of the features shown and described or parts thereof, but on the contrary it is intended to include therein any and all equivalents, modifications and adaptations which may be employed without departing from the spirit of the invention.

What is claimed is:

1. A scanning device comprising a plurality of input conductors, means connecting each of said input conductors to ground, an output conductor, a plurality of control leads distinctive in different permutations to each of said input conductors, passive means interconnecting said input conductors with said output conductor and a plurality of said control leads over a plurality of paths, means rendering each of said paths selectively conductive by the activation of one of said permutations of said control leads and the disconnection of ground from the input conductor to which said permutation is distinctive.

2. A device according to claim 1 in which said means interconnecting said input conductors with said output conductor and a plurality of said control leads comprises a plurality of asymmetrical current devices.

3. A scanning device comprising a plurality of input conductors, means activating each of said input conductors to open circuit and another electrical condition, an output conductor, a first plurality of control leads, a second plurality of control leads, said first plurality and said second plurality of control leads being distinctive in different permutations to each one of said input conductors, passive means interconnecting said input conductors with said output conductor and said first plurality and second plurality of control leads over a plurality of paths and resistors connected in said second plurality of control leads rendering each of said paths selectively conductive by the energization of one of said permutations and by the activation of the input conductor to which said permutation is distinctive to said open circuit condition.

4. A device according to claim 1 in which said means interconnecting said input conductors with said output conductor and said control leads comprises a plurality of asymmetrical current devices.

5. A device according of claim 3 in which said first plurality of control leads contain asymmetrical current devices serially connected therein.

6. A scanning device comprising a plurality of control leads, a plurality of input conductors each specifically referable to a different permutation of said control leads, an output conductor, means open circuiting and grounding each of said input conductors, means applying electrical potentials to said control leads in said different permutations, passive means interconnecting said output conductor with said input conductors and said control leads, and means including said last-mentioned means responsive to the application of said electrical potentials to said control leads in said permutations extending a plurality of paths from said control leads to said output conductor upon the application of said potentials to a permutation of control leads and the concurrent open circuiting of the input conductor to which said permutation is distinctive.

7. A scanning device comprising a plurality of control leads, means applying electrical potentials to said control leads in different preselected permutations thereby to energize said control leads in said different preselected permutations, a plurality of input conductors each specifically referable to a different one of said preselected permutations of said control leads, an output conductor, means open circuiting and grounding each of said input conductors, and passive means interconnecting said output conductor with said input conductors and said control leads responsive to the energization by said electrical potentials of any of said permutations of control leads and the concurrent open circuiting of the input conductor to which the energized permutation of control leads is referable for establishing a flow of electrical current from one of the leads within the energized permutation of control leads to said output conductor.

8. A scanning device comprising an output conductor, a first and a second input conductor, a plurality of control conductors, a source of activating potential, means selectively activating said control conductors in different permutations with said activating potential, each of said permutations being representative of a different one of said input conductors, a plurality of resistors each serially interconnecting a different one of certain of said control conductors with a different one of each of said input conductors, means selectively grounding said input conductors, a resistor serially interconnecting said output terminal and ground, a plurality of passive asymmetrical current devices each having a low impedance input terminal and a low impedance output terminal, the low impedance output terminals of said devices being severally connected each to a different one of said input conductors and all of the low impedance input terminals of said devices being connected in common, and circuit means interconnecting said output conductor with the common connection of said asymmetrical devices.

9. A device according to claim 1 in which said means rendering each of said paths selectively conductive by the activation of one of said permutations of said control leads and the disconnection of ground from the input conductor to which said permutation is distinctive are a plurality of asymmetrical current devices.

References Cited in the file of this patent

UNITED STATES PATENTS

| | | |
|---|---|---|
| 2,476,066 | Rochester | July 12, 1949 |
| 2,563,589 | Den Hertog | Aug. 7, 1951 |
| 2,563,824 | Dunlap | Aug. 14, 1951 |
| 2,580,716 | Rochester | Oct. 9, 1951 |
| 2,610,243 | Burkhart et al. | Sept. 9, 1952 |
| 2,620,395 | Snijders | Dec. 2, 1952 |
| 2,674,727 | Spielburg | Apr. 6, 1954 |
| 2,718,589 | Staples | Sept. 20, 1955 |

FOREIGN PATENTS

| | | |
|---|---|---|
| 1,012,089 | France | Apr. 9, 1952 |
| 711,053 | Great Britain | June 23, 1954 |
| 523,475 | Canada | Apr. 3, 1956 |